US006272636B1

(12) United States Patent
Neville et al.

(10) Patent No.: US 6,272,636 B1
(45) Date of Patent: *Aug. 7, 2001

(54) DIGITAL PRODUCT EXECUTION CONTROL AND SECURITY

(75) Inventors: Eugene A. Neville, Hillsboro; Jimmy L. Sesma, White City, both of OR (US)

(73) Assignee: Preview Systems, Inc, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,019

(22) Filed: Apr. 11, 1997

(51) Int. Cl.[7] .................................................. G06F 11/30
(52) U.S. Cl. ............................. 713/189; 713/190; 705/57
(58) Field of Search ..................... 380/4; 707/9; 705/51, 705/57, 59, 58; 713/189–190, 193

(56) References Cited

U.S. PATENT DOCUMENTS

| | | | |
|---|---|---|---|
| 4,465,901 | * 8/1984 | Best .................................... 713/190 |
| 4,528,643 | 7/1985 | Freeny, Jr. . |
| 5,224,166 | * 6/1993 | Hartman, Jr. ......................... 713/190 |
| 5,307,504 | 4/1994 | Robinson et al. . |
| 5,341,429 | 8/1994 | Stringer et al. . |
| 5,509,070 | 4/1996 | Schull .................................... 705/54 |
| 5,535,329 | 7/1996 | Hastings ................................ 714/35 |
| 5,544,356 | 8/1996 | Robinson et al. . |
| 5,584,023 | * 12/1996 | Hsu ........................................ 7/204 |
| 5,629,980 | * 5/1997 | Stefik et al. ............................ 380/4 |
| 5,673,315 | 9/1997 | Wolf ...................................... 705/59 |
| 5,677,953 | * 10/1997 | Dolphin ................................. 380/4 |
| 5,745,678 | * 4/1998 | Herzberg et al. ..................... 395/186 |
| 5,757,908 | * 5/1998 | Cooper et al. ......................... 380/4 |
| 5,815,653 | 9/1998 | You et al. . |
| 5,826,011 | * 10/1998 | Chou et al. ........................... 713/200 |
| 5,870,543 | * 2/1999 | Ronning ............................... 395/186 |
| 5,883,954 | * 3/1999 | Ronning ................................. 500/4 |
| 5,883,955 | * 3/1999 | Ronning ................................. 380/4 |

FOREIGN PATENT DOCUMENTS

WO 98/33106    7/1998  (WO) .

* cited by examiner

Primary Examiner—Gilberto Barron, Jr.
Assistant Examiner—Ho S. Song
(74) Attorney, Agent, or Firm—Keith A. Cushing

(57) ABSTRACT

Digital product execution control as disclosed contemplates production of a final version of a digital product and subsequently imposing execution control on that digital product. The manufacturer of the original digital product need not incorporate execution control features into the final version of the product. Execution control programming attaches to an executable file of the digital product to create a controlled executable file. The resulting operating environment when loaded is insufficient for the original executable file, and control programming determines whether or not execution will be allowed. If allowed, control programming creates the necessary operating environment for the digital product, i.e., as would be provided by the operating system if loaded normally, and allows execution of the digital product only under controlled conditions. Further security measures identify an executable portion of the digital product and a plurality of sub-portions of the executable portion are encrypted. An exception handler is established with the operating system and upon access to memory regions marked as protected the exception handler decrypts each sub-portion when accessed. A further security measure stores at a remote clearing house a key needed to decrypt the digital product for use. Upon execution, the controlled digital product interacts with the remote clearing house to obtain permission to execute and to obtain the key needed for execution.

17 Claims, 12 Drawing Sheets

DIGITAL PRODUCT EXECUTION CONTROL AND SECURITY

RELATED APPLICATIONS

This application relates to co-pending application Ser. No. 08/837,018 filed concurrently herewith and entitled Digital Product Execution Control.

FIELD OF THE INVENTION

The present invention relates generally to product production and distribution, and particularly to digital product production and distribution including distribution of digital products in an execution controlled form.

BACKGROUND OF THE INVENTION

Digital products, e.g., computer software and data, have been published widely through a variety of methods and mediums. Publishers have sold and distributed digital products like other products, e.g., packaged and available at retail outlets or through catalog and mail-order delivery. The nature of digital products, however, lends itself to non-traditional methods of distribution. Because common devices, e.g., personal computers and modems, duplicate digital material without degradation, consumers can copy and distribute reliably most digital products. Examples include shareware and distribution by modem via computer bulletin boards or the well-known Internet global communication medium. A second popular digital product distribution mechanism is CD-ROM, a relatively inexpensive medium having vast storage capacity, allowing publishers to distribute on a single disk a large volume of digital material including supporting documentation and manuals.

Such methods of broad distribution attract both publishers and end-users of digital products. Widespread distribution of fully functional digital products occurs accurately and without significant cost to the publisher. End-users access a variety of products for comparison with opportunity to actually try each product before making a decision to purchase. In essence, the end-user receives the fully functional digital product as an offer to purchase based on an opportunity to fully evaluate the actual product. The publisher profits when the evaluation process yields sufficient purchasers. This "try-before-you-buy" distribution mechanism is especially attractive in the context of global communication networks such the Internet where distribution occurs globally at minimal cost and where an enormous number of potential purchasers of digital products interact.

Unfortunately, the ability to accurately copy and make use of digital products lends itself to unauthorized use of digital products by unauthorized users. For example, persons using the digital product fully and indefinitely beyond an initial evaluation period take value from the publisher. Digital products may be easily reproduced and the publisher can take advantage of this characteristic as a distribution mechanism, however, the publisher risks unauthorized use and lost sales under such a distribution mechanism without some form of control over product execution. The digital product publisher taking advantage of such broad distribution schemes must implement some form of control to prevent unauthorized use of the digital product while still making the product widely available for consumer-evaluation.

Early attempts to control use of published digital products included distribution of an "evaluation" copy of a digital product. The evaluation copy, "diminished" relative to the actual product, introduced the consumer to the product, but wouldn't allow or even include code supporting fully functional use. To produce the evaluation copy, the product author, e.g., programmer, would rewrite the product in an alternate, i.e., less functional, form. In such product re-design process, difficult issues arose with respect to the degree of inoperability established relative to the fully operational form of the product. Furthermore, a consumer wishing to purchase the product following trial use of the evaluation copy had to obtain a fully functional version through traditional, e.g., retail, distribution mechanisms.

A second, but only slightly more successful, approach contemplated distribution of a "crippled" form of the fully functional product. Distribution material would include a fully functional digital product, but also safeguards incorporated into the product to prevent fully functional use until authorization, i.e., purchase, occurred. For example, a word processing program could not, in its crippled form, print a document or save a document to disk. When, following an evaluation period, the user decided to purchase the product, a purchase procedure "de-crippled" the product for fully functional use. For example, the purchaser received a "key", i.e., a predetermined coded value, required to convert the crippled form of the product to a truly fully functional form. The consumer need not physically obtain a new copy of the product at the time of purchase.

Unfortunately, users demand a truly fully functional form of the product during the evaluation period. To meet such user demand, providers of digital content now distribute a fully functional form of the digital product for evaluation, yet control in some manner the use of the product to prevent unauthorized use, i.e., prevent use beyond an allowed trial evaluation.

A "metering" mechanism used in association with a published "try before you buy" digital product places a limitation on a potential purchaser's use of the digital product. A metering mechanism is required for distribution of a fully functional version of a digital product. Otherwise, the potential purchaser has no reason to become an actual purchaser. A metering limitation might include a time period of allowed use followed by a purchase requirement for continued use. Another common metering limitation is a limited number of uses, e.g., limited number of executions, followed by a purchase requirement for continued use. Important to note, during evaluation the potential purchaser has full use of the product.

Unfortunately, converting a fully functional digital product to a metered form for distribution introduces not only a new and significant production step, but also introduces an opportunity to create flaws or "bugs" in the product. This also tends to introduce complexity into the published product not related to operation of the product itself as designed by the software developer, but complexity as related to implementation of a reliable metering function.

As digital products evolve, especially computer program products, overall size and complexity increase. Software developers hesitate to implement quick solutions for known problems, fearing introduction of yet additional problems. A particular condition or "bug" sometimes requires many specific ordered steps to manifest itself. Software developers use sophisticated software testing scripts providing repeatable recursion testing for past or known "bugs" to insure the quality of the latest version of a given program. Developers endeavor to minimize the resource usage of their products and to keep the size of the programs as small as possible. This can be an especially sensitive problem if the proposed growth of a product requires an increase in the number or type of distribution medium, e.g., adding an additional diskette to a software product is considered a costly requirement.

The need to produce a fully functional demonstration version of a product, i.e., a "try before you buy" version of a product, normally introduces a higher order magnitude of difficulty. Creating a "crippled" version of the full-functioning product and/or controlling usage and maintaining version control of both the crippled version and the non-crippled version is a daunting task, not to mention the need to execute elaborate, e.g., recursion, testing of both versions of the product. In essence, the manufacturer must provide two products instead of one, i.e., doubles the product inventory and associated testing and product management.

Most solutions for such problems faced by software developers require extensive involvement of software programmers, quality control labs, version/source control managers and, most importantly, time. Any "automated" solution to metering or to execution control usually requires the original software programmers to reprogram their final product to utilize the "automated" solution. The "automated" solution is usually in the form of additional development software provided by a third party that needs to be integrated with a final product via programming. This type of solution is commonly referred to as an "SDK" (software development kit) approach. An SDK approach to metering, however, introduces complexity and potential for programming errors unrelated to operation of the product itself. Further, and far from trivial, the use of an SDK approach adds time and cost to the development cycle.

Developers of digital products prefer to simply create the digital product without limitation or additional production steps unrelated to use and operation of the fully functional form of the product. In other words, it is difficult enough to produce a fully functional form of the product as designed without the additional complexity of incorporating safeguards against unauthorized use beyond a trial evaluation.

Thus, distribution of digital products according to the "try before you buy" method should not require that the creator of the digital product modify its design to meet a particular distribution scheme. At present, "try before you buy" distribution schemes typically require some modification of the digital product by the original developer to implement distribution in a metered form, i.e., a controllable form allowing distribution and evaluation of a fully functional product but not allowing long term use.

Ideally, digital products are produced without use limitations or safeguards, leaving the creator of the digital product exclusively to the task of implementing the digital product itself. The present invention allows a creator of a digital product to concentrate on the product itself without requiring the creator to incorporate safeguards or limitations against unauthorized use.

Digital product distribution according to the "try before you buy" distribution method is an example of a need to impose execution control over a digital product. Such execution control has nothing to do with the digital product as designed, but represents an auxiliary feature imposed upon the product and unrelated to the product's operation or function as designed. Other forms of execution control, i.e., other forms unrelated to product execution as designed, include encryption and decryption functions applied for security purposes, compression and decompression functions to conserve media storage space, long term metering of usage for billing purposes or license usage enforcement, and interfacing with other programs or systems or controlling agents to enforce ongoing authorization of use. Generally, these auxiliary control features imposed upon a digital product have purposes unrelated to the execution of the digital product as designed, but rather are imposed for other reasons.

Thus, it is desirable to impose execution control over a digital product, but undesirable to require that such execution control be integrated into the design and production of the digital product. The subject matter of the present invention advantageously isolates digital product design from imposition of auxiliary execution control.

One form or mechanism for imposing control over the execution of an application has previously been available through the use of "TSR" (terminate and stay resident) programs. A TSR program loads into a computer and remains available while any other application might be called upon to run. A TSR is normally thought of as a "DOS"-based facility, but it can provide similar services for WINDOWS (™) based applications as well. A WINDOWS (™) "device driver" or "VxD" (virtual device driver) can provide similar services only for WINDOWS (™)-based applications. However, the use of such TSRs or VxDs to provide execution control, e.g., for metering, is impractical because there is no mechanism to enforce the presence of such a control. The control device must accompany the application to be metered. And more importantly, it is mandatory that it be done in such fashion that metering cannot be avoided, i.e., that the application cannot run unless the metering function or control device permits it. Generally, TSRs and VxDs cannot guarantee such execution control.

Thus, there remains need for improvement in the area of execution control over existing applications. Execution control can be designed into an application. The application designer, however, most preferably ignores any such auxiliary control issues and designs the product strictly according to its intended function. Auxiliary control, preferably, is imposed upon the digital product in its final form as produced according to its design without reference to any such auxiliary control in its original design. The subject matter of the present invention provides a mechanism for imposition of execution control over an application without requiring that the application design include such control features. Under the present invention, the application may be first designed and manufactured to final form as intended with execution control imposed subsequently upon the digital product as taken in its final form.

SUMMARY OF THE INVENTION

Digital product execution control and security under the present invention applies to a digital product having incorporated therein execution control programming limiting use of the digital product to a given controlled use. Under one aspect of the present invention, a method of providing security against use outside controlled use includes first identifying an executable portion of the digital product to be loaded for execution in memory regions of a computing device. A plurality of sub-portions of the executable portion are identified and each sub-portion is loaded for execution in an associated memory region during controlled use. Memory regions holding each sub-portion are marked through the operating system as being protected. An exception handler is established with the operating system and upon access to memory regions marked as protected the exception handler decrypts each sub-portion when accessed.

The method is further enhanced by encrypting each subportion with a unique encryption key. Furthermore, each associated memory region upon first access thereto may be marked as being unprotected. The method may further include identification of memory regions remaining marked as protected and selectively re-encrypting at least one subportion and re-marking as protected the associated memory region.

In a digital product having incorporated therein execution control programming limiting use of the digital product to a given controlled use, a method of providing security against use outside said given use under the present invention includes encrypting at least one portion of the digital product prior to distribution, a key being necessary to decrypt and make executable the at least one portion encrypted. The method further contemplates storing the key in association with an identifier of the digital product at a clearinghouse with the clearinghouse being adapted for telecommunication interaction. The method incorporates into the control programming telecommunication programming adapted for interaction with the clearinghouse. The control programming provides to the clearinghouse by telecommunication interaction upon execution thereof a product identifier and request to execute the digital product. The clearinghouse selectively provides the key to the control programming in response to the request to execute based on established limitations of the controlled use.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention provides an ability to add various types of control functionality and/or characteristics to a digital product after its final creation by its original developer, i.e., without involving effort or even knowledge on behalf of the original developer and without use of a software development kit (SDK).

Figure 1:
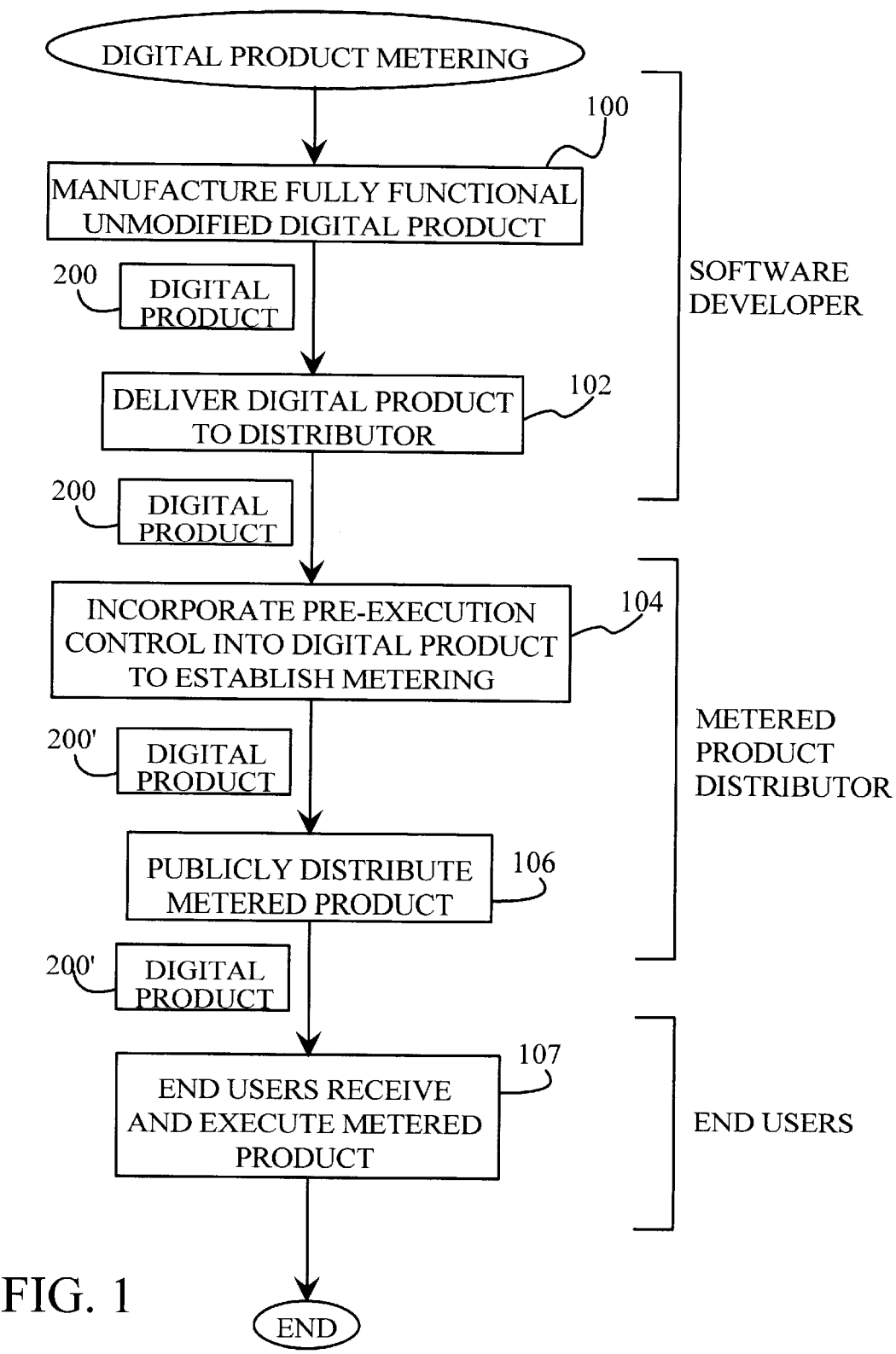
FIG. 1 is a flow chart illustrating production and distribution of metered digital products according to one embodiment of the present invention.

FIG. 1 illustrates generally one embodiment of the present invention whereby a metering function is incorporated into a previously manufactured fully functional digital product. Generally, the present invention imposes execution control over a given product to establish additional functionality, e.g., to establish a metering function relative to use of the fully functional digital product. Thus, while a metering function is shown to illustrate the present invention, other execution control functions may be incorporated into a digital product including, but not limited to, compression of critical parts of the product to allow more content to be stored on the distribution media and/or less space consumed on the final storage media (typically a hard drive); encryption of critical parts of the product providing a degree of security; long term metering of usage for billing purposes or license usage enforcement; and, interfacing with other programs or systems or controlling agents to enforce authorization of use.

In FIG. 1, digital product metering according to a preferred embodiment of the present invention begins in block 100 where a software developer manufactures a digital product 200 (FIG. 2) in its fully functional and unmodified form as intended for use by an end-user. The software developer need not be concerned with functions or design associated with a later implemented distribution scheme, e.g., a metering function or auxiliary features such as encryption or compression. The software developer need only design and implement the digital product 200 as desired without use of unrelated SDK resources. In block 102, the software developer delivers the unmodified digital product 200 to a metered product distributor, i.e., one who converts the fully functional product 200 into a fully functional but metered digital product 200' to allow controlled "try before you buy" distribution. By imposition of the present invention on the original digital product 200, one converts the original digital product 200 into a metered digital product 200' by converting an executable file 202*a* (FIG. 2) of product 200 into an executable file 202*a'* (FIG. 4) of product 200'.

In block 104, the metered product distributor incorporates execution control into the digital product 200 to produce, in the illustrated example, metered digital product 200'. In block 106, the metered product distributor makes the metered digital product 200' publicly available by free distribution of the metered digital product 200'. For example, the metered digital product 200' may be posted on bulletin boards, made available on the Internet global communication medium or distributed on CD ROM media. Because metered digital product 200' is protected against unauthorized or long term use by virtue of the metering function established, wide spread and copious distribution of metered digital product 200' is most desirable. Following public distribution of the metered product 200', end users receive, in block 107, copies of the metered product 200' for evaluation by execution thereof on a given computing device.

Thus, the software developer concentrates on his or her special expertise, i.e., producing a fully functional and reliable digital product as designed, and the metering function becomes part of the distribution process. The software developer need have no involvement in implementation of or concern regarding the metering function, or any other auxiliary function implemented under the present invention.

Figure 2:
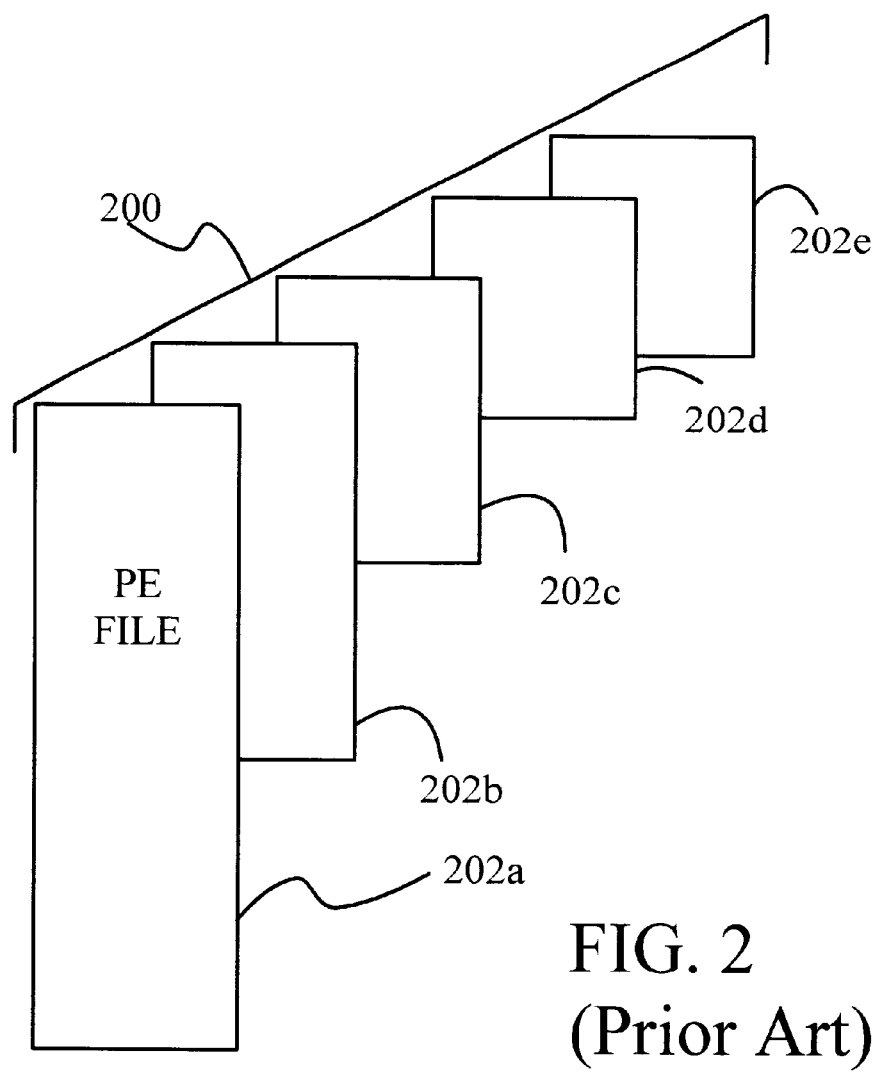
FIG. 2 illustrates schematically various components of a digital product in its fully functional form as designed and produced by the developer without incorporating any metering function therein.

FIG. 2 illustrates schematically the conventional or original fully functional digital product 200 as produced by the software developer and ready for normal execution as designed. In other words, digital product 200 as illustrated in FIG. 2 represents the fully functional form of digital product 200 without incorporation of any features, e.g., metering features, unrelated to the operation of digital product 200. In FIG. 2, the particular digital product 200 illustrated herein includes a variety of individual components, individually components 202a–202e. As may be appreciated, any given digital product may include one such component 202 or any number or size of components 202. One of components 202, however, will be regarded as the primary executable file, i.e., component 202a in FIG. 2. In the particular embodiment illustrated herein, component 202a is a program executable under the WINDOWS (™) operating system and conforming to the portable executable (P.E.) file format designed for use by such operating systems as WINDOWS NT and WINDOWS 95™. The subject matter of the present invention may be applied, however, to other file formats and operating system loading and executing methods.

Figure 3:
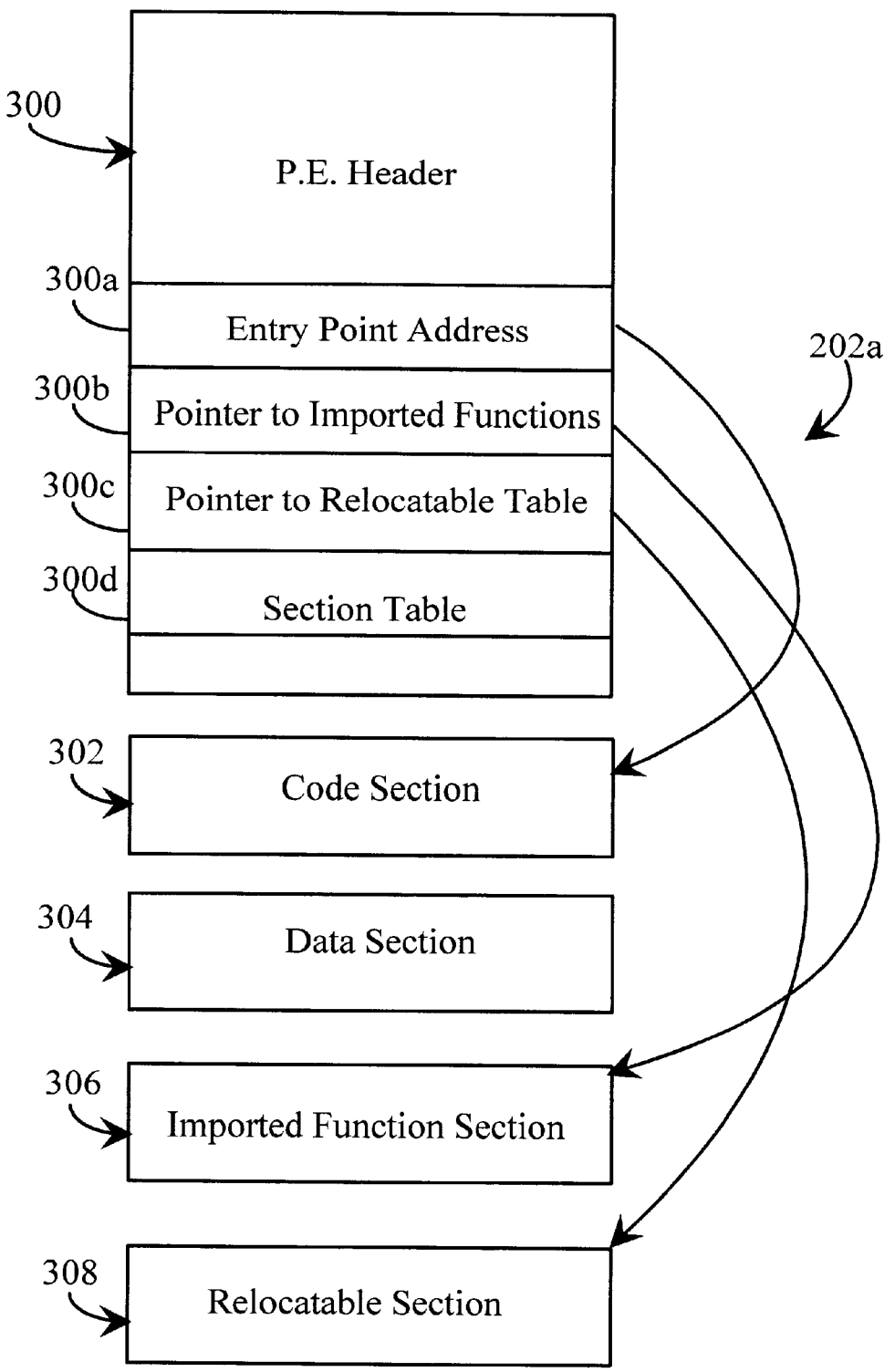
FIG. 3 illustrates partially a prior art format for an executable component of the digital product of FIG. 2.

FIG. 3 illustrates in more detail portions of the structure of executable component 202a of FIG. 2. More particularly, FIG. 3 illustrates executable component 202a in its original form as provided by the software developer, i.e., a fully functional unmodified form of the digital product 200. In FIG. 3, executable component 202a includes a P.E. header 300, a code section 302, a data section 304, an imported functions section 306, and a relocatable section 308. The structure of P.E. header 300 provides access to several pieces of information modified under the present invention. More particularly, header 300 includes an entry point address 300a indicating the location of the first program instruction to be executed following loading of component 202a. In the illustrated example, entry point address 300a points to a location in code section 302. Header 300 also includes an imported functions pointer 300b indicating the location of imported functions section 306. A relocatable table pointer 300c indicates the location of relocatable section 308. Header 300 also includes a section table 300d including an entry therein for each section of component 202a, e.g., an entry for each of code section 302, data section 304, imported functions section 306, and relocatable section 308.

Figure 4:
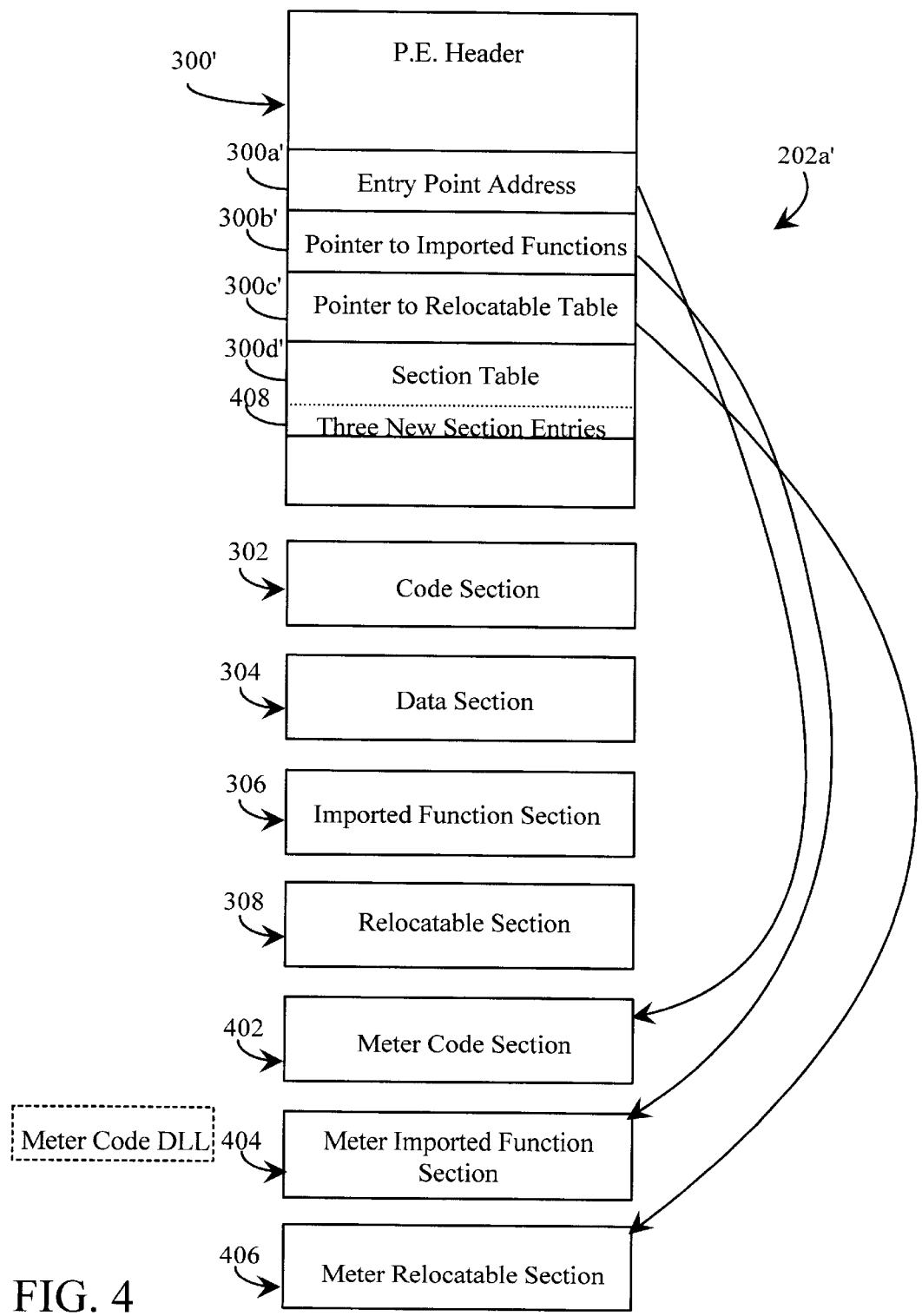
FIG. 4 illustrates partially the structure of the prior art executable file of FIG. 3, but as modified under the present invention to implement execution control establishing a metering function relative to the original digital product of FIG. 2.

FIG. 4 illustrates portions of component 202a' as modified under the present invention to implement execution control over the digital product 200. In FIG. 4, header 300' corresponds generally to the header 300 of FIG. 3 but includes modifications. Executable component 202a' includes intact the original code section 302, original data section 304, original imported functions section 306, and original relocatable section 308. In addition, the illustrated embodiment adds three new sections, i.e., a meter code section 402, a meter imported functions section 404, and a meter relocatable section 406. Section table 300d' corresponds to the original section table 300d, but includes new table entries as indicated at reference numeral 408. More particularly, the new table 300d' entries 408 correspond to the new sections 402, 404, and 406 appended to component 202a' under this particular embodiment of the present invention.

Entry point address 300a' references the beginning executable instruction in the meter code section 402. As may be appreciated,. the original entry point address 300a is preserved under the present invention for later use as described more fully hereafter. The imported functions pointer 300b' points to the new meter imported functions section 404, and the original imported function pointer 300b is preserved for later use as described more fully hereafter. The relocatable table pointer 300c' indicates the location of meter relocatable section 406, and the original relocatable table pointer 300c is preserved for later use as described more fully hereafter.

Modifications imposed to create executable component 202a' allow the operating system to load component 202a' for execution, but such modifications establish execution control under programming held in the meter code section 402. Reference herein to execution control programming in or performed by meter code section 402 shall also include additional modules referenced by section 402 and provided in conjunction with digital product 200'. Limited execution control programming can be implemented in a small code section 402, however, more sophisticated control programming can be place in an associated external code or data file, e.g., a dynamic link library (DLL) module as available under the WINDOWS (™) operating system. Under such arrangement, the actual code section 402 injected into a digital product may be a very short sequence of machine code instructions calling a procedure in an associated DLL file, e.g., one provided in conjunction with converting digital product 200 to digital product 200'. Once code section 402 executes, control passes to this external control programming code holding the bulk of execution control programming under the present invention. Accordingly, it shall be understood that reference herein to execution of code section 402 shall be taken to include reference to any such additional programming, e.g., programming in an associated DLL file, added to product 200 and called directly or indirectly by code section 402.

Figure 5:
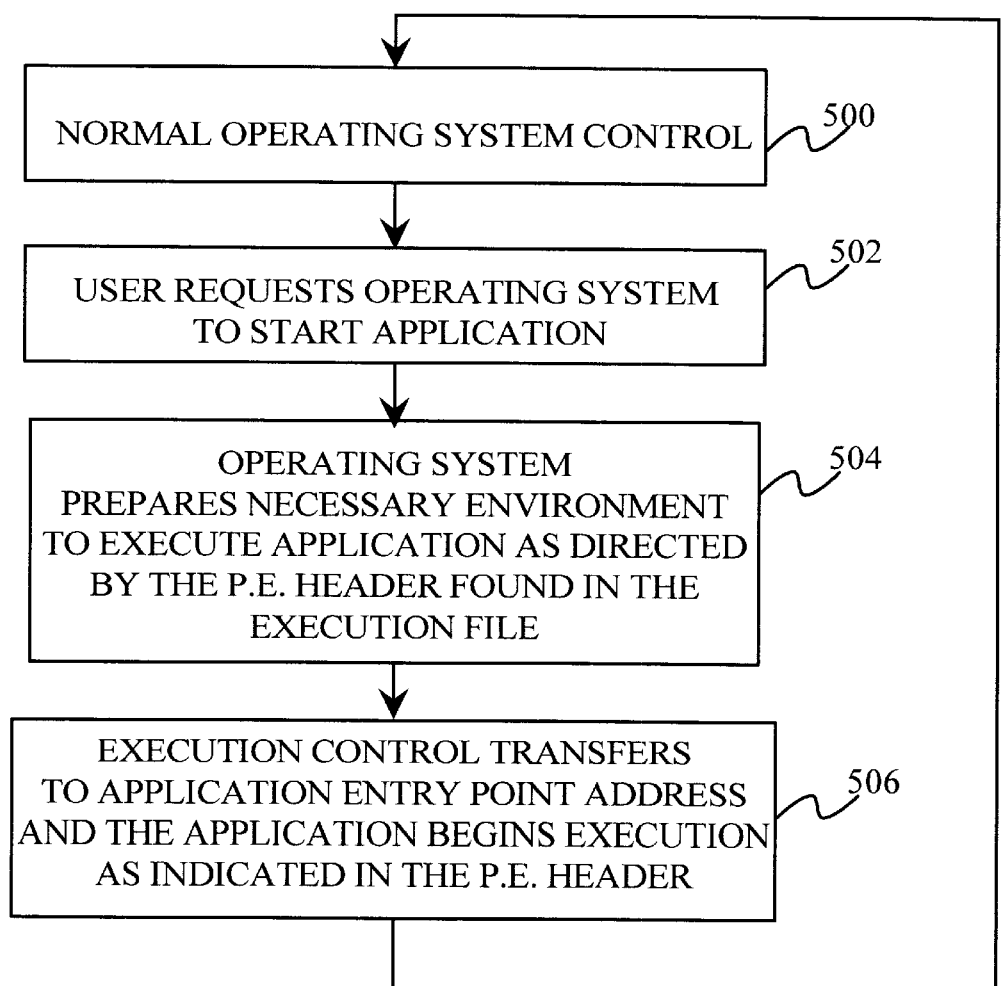
FIG. 5 is a flow chart illustrating generally conventional steps executed when an operating system loads and executes the executable file of FIG. 3.

Thus, under the illustrated embodiment, a metering function operates under the programming of code section 402, e.g., allows a limited number of metered digital products 200' executions or allows product 200' execution only during a limited time period. Once the meter code section 402 completes its metering function, e.g., determines that digital product 200' may execute, meter code section 402 processes the original imported functions section 306 and original relocatable section 308 in a manner corresponding to that normally done by the operating system. Processing control then passes to the instruction indicated in the original code section 302, i.e., control passes to the address indicated by the original entry point address 300a. The operating system has no indication that an execution control segment has been introduced into the metered digital product 200'. In other words, the operating system loads and executes executable component 202a' in a manner identical to that of 202a, but by virtue of the modifications implemented under the present invention a metering function, or auxiliary function, exists without involving the operating system in the process. FIG. 5 illustrates in simplified flow chart form the normal loading and execution of a digital product, i.e., loading and execution of the original executable component 202a. In FIG. 5, block 500 represents normal operating system control prior to a user request to execute, for example, the original digital product 200. Processing advances to block 502 when a user requests that the operating system start an application, i.e., execute the original digital product 200. In response, the operating system prepares in block 504 the necessary environment to run the original digital product 200 including reading the executable component 202a from a storage medium.

In block 506, execution control transfers to the application, i.e., the program instruction indicated in the original entry point address 300a. Thereafter, the application executes normally. When the application terminates, control returns to block 500, i.e., normal operating system control independent of original digital product 200.

Figure 6:
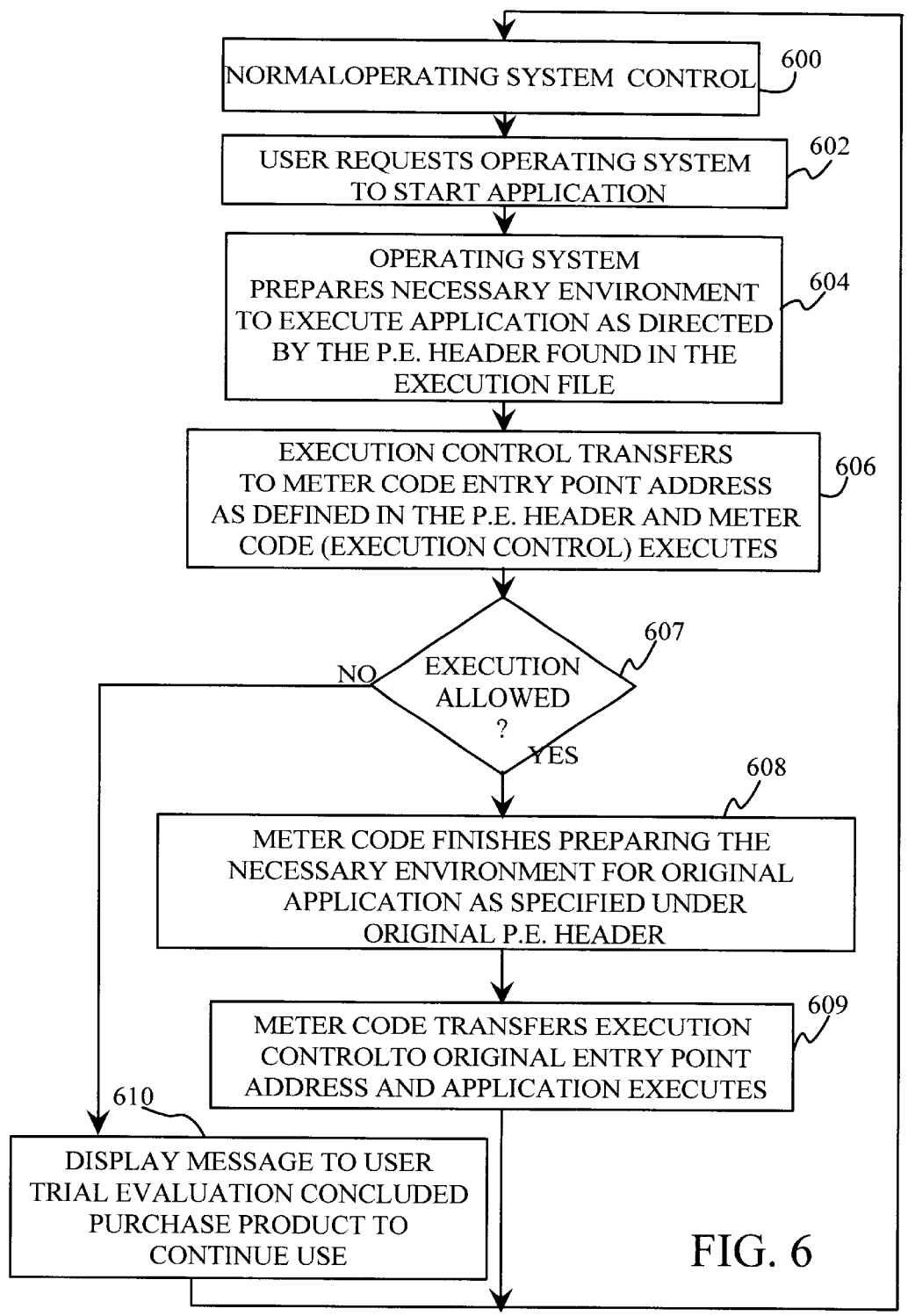
FIG. 6 illustrates by flow chart steps executed under the present invention when an operating system loads and executes the executable file of FIG. 4.

FIG. 6 illustrates loading and execution of metered digital product 200', i.e., loading and execution of component 202a'. Block 600 represents normal operating system control, i.e., normal operating system operation prior to launch or execution of product 200'. In FIG. 6, processing advances to block 602 when a user requests execution of metered digital product 200'. In block 604 the operating system prepares the necessary environment to run product 200' including reading the executable component 202a' and header structure 300' as provided under the present invention. In block 606, execution control transfers to the meter code section 402 by virtue of the modified entry point address, i.e., the entry point address 300a'.

Once execution control passes to the meter code section 402, a variety of auxiliary functions may be implemented, i.e., in the present illustration a metering function operates. Decision block 607 represents programming provided by meter code section 402 and determines if continued execution of product 200' is allowed. Programming associated with decision block 607 determines according to some criteria, e.g., number of allowed executions or execution only during an allowed time period, whether the trial evaluation of metered digital product 200' remains in effect. If the trial evaluation is complete, the control passes to block 610 where meter code section 402 presents a message to the user indicating the trial evaluation has terminated and that purchase is now required to continue use. Code section 402 then terminates and control returns to block 600 for normal operating system control, i.e., as before the user initiated execution of product 200.

If continued execution of metered digital product 200' is allowed in block 607, then meter code 402 establishes in block 608 the necessary operating environment as specified in the original P.E. header 300. In particular, meter code 402 uses the original entry point address 300a, the original pointer 300b to the original imported functions section 306, and the original pointer 300c to the original relocatable section 308. Control transfers in block 609 as originally intended, i.e., transfers as intended in the original code section 302 as indicated by the original entry point address 300a. In essence, meter code 402 emulates the normal operating system load and execute procedures.

In a particular implementation of the present invention, three basic software components have been used to establish a high security metering function. More particularly, a metered digital product, e.g., product 200', includes programming corresponding to block 607 in FIG. 6 and acting as a client entity. A server entity interacts from a remote location to determine whether execution of a given digital product will be allowed. In other words, an end-user machine interacts, e.g., via telephone connection, with a remote server making determination as to whether this particular execution of this particular digital product by this user will be allowed. Encryption of selected portions of the digital product enhance security. Maintaining decryption keys at the remote server location severely restricts opportunity to maliciously decrypt and make operable the digital product locally, i.e., at an end-user machine. Thus, the three basic software components include a builder program used in a manufacturing step to convert a digital product into a metered digital product, a client program operating as control programming in the metered digital product and performing functions associated with decision block 607 in FIG. 6, and a server program located at a remote location relative to an end-user machine executing the metered digital product.

The builder program (FIG. 7) accepts as input the original application from the original software developer, e.g., digital product 200, and converts the application into an execution controlled digital product, e.g., metered product 200'. The client application is incorporated into the original application, e.g., execution control as provided in the case of meter control by meter code section 402. In this manner, the client, e.g., meter code section 402, is distributed with the original application and when executed by an end-user gets control of execution and allows execution only under given conditions, e.g., execution allowed during an evaluation in the case of a metered application. The client application, once invoked and before the metered application is allowed to run, establishes a network connection, e.g., via the Internet, with the server application running at a publisher, reseller, or clearinghouse site. This client-server relationship can be established according to conventional methods via the Internet or a variety of network and direct one-to-one communication methods and protocols.

The server application is located at a remote site or clearinghouse which interacts with the client and tracks, in the case of a metered execution control, the amount of time or usage a particular user has remaining before purchase is required for continued use of a metered product. The server stores a symmetric unlock key used previously by the builder (FIG. 7) to encrypt selected portions of the metered application, e.g., code section 302 (FIG. 4) and entries 408 in section table 300d'. The builder program uses this key to encrypt such selected portions of the metered digital product 200' at the time of converting product 200 to product 200'. As distributed publicly, however, the key is not provided with metered digital product 200' nor is it stored at any time permanently on the end-user's computing device. Thus, to decrypt these selected portions of the metered digital product, and have basis for executing the original digital product 200, the client application must receive this key from the server application at a time when execution is requested, e.g., such as represented in decision block 607 of FIG. 6.

Under this arrangement, the end-user's computer includes the necessary telecommunication equipment and access to telecommunication services to interact with the server at the clearinghouse. Execution control is thereby dictated by permission or authorization established at a remote site, i.e., execution is authorized at the remote clearinghouse. In this aspect, the client software executing on the end user machine in cooperation with the server software executing on a clearinghouse machine together ensure that a user cannot, in the case of a metered application, run the application following expiration of an allowed evaluation use.

Figure 7:
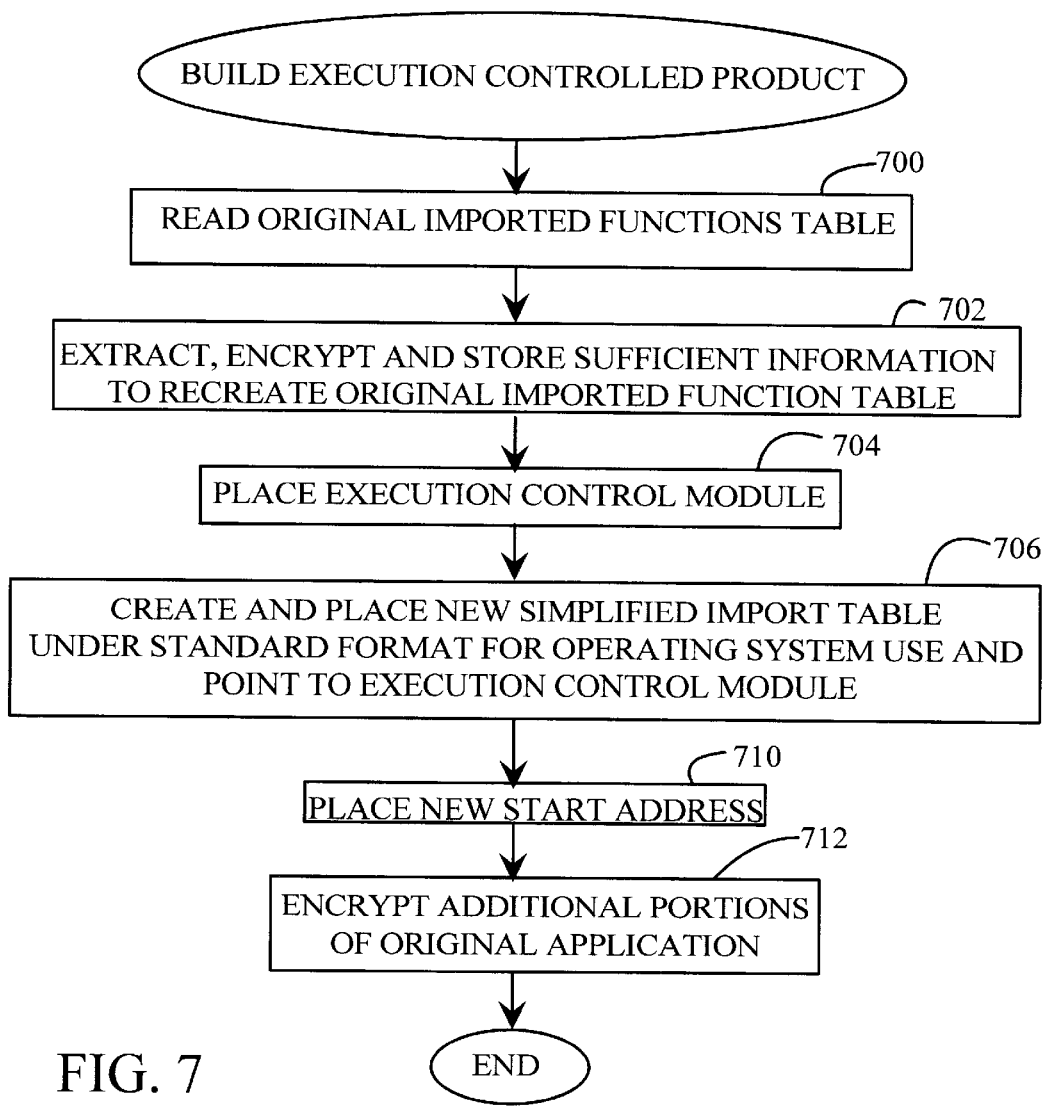
FIG. 7 illustrates by flow chart a manufacturing step converting a digital product into a metered digital product in accordance with one embodiment of the present invention.

FIG. 7 illustrates generally by flow chart the operation of the builder software component responsible for modifying a given application, e.g., modify digital product 200 to include execution control, such as metered usage as provided by meter code section 402 (FIG. 4) and any associated DLL file. As may be appreciated, programming illustrated in FIG. 7 need be executed only once for a given product, and thereafter copies of the modified form of the product are publicly distributed as illustrated in FIG. 1. The building process involves several stages, including import table manipulation, data encryption, execution control code injection. Only the execution control code injection stage is required for the purposes of controlling execution, e.g., metering application usage. The manipulation and encryption stages provide additional security by increasing the "tamper resistance" of the application. Accordingly, the following discussion will focus primarily on import table manipulation, data encryption, and injection of execution control code.

With respect to the WINDOWS (™) operating system, executable files contain an "import table" as discussed above which lists the functions the executable file uses, i.e., lists other executable files or "modules" needed for proper execution. These other "modules" typically include operating system or utility library functions. When an executable file is loaded for execution, the operating system must ensure that all modules that are referenced in the import table are loaded into the program's memory space in addition to the executable file. The operating system then determines all the resulting "entry points" of each function listed in the import table, and places the memory address of each entry point in the import table. Once the operating system has finished loading the executable and providing the proper environment, e.g., placing appropriate entry point memory addresses in the import table, the operating system allows the executable file to execute by passing control to the start address indicated in the executable file header section. The executable file expects and absolutely requires that all memory addresses of all its imported functions will be available in the import table. When invoking these modules or functions the executable file passes control to the addresses found in the imported function table.

Thus; the import table establishes a required operating environment and contains critical information necessary for the operation of the executable file. Without an appropriately configured import table, i.e., appropriately configured by the operating system, the executable cannot call external functions and no useful operation occurs. In other words, the executable cannot use any modules or utilities outside that found in its own code section. Because many such functions are basic operating system utility functions, a corrupted import table will prevent entirely acceptable operation of a program.

In FIG. 7, the builder component first reads in block 700 the original imported functions table. In block 702, the builder extracts and stores sufficient information to later recreate the original imported function table. Also in block 702, the builder encrypts this information with a key held only by the server component at the remote clearinghouse site. In block 704, the builder places the execution control module in the application to be controlled, e.g., places sections 402, 404, and 406 as illustrated in FIG. 4 by appending these files to the original executable file. In establishing execution control under the present invention, code section 402 may be simply a small segment of machine code appended to the original executable file as illustrated in FIG. 4. This machine code can reference an associated meter code DLL file which contains the bulk of control programming, i.e., the client application as described herein, determining whether execution is to be allowed. As discussed previously, the section table in the header of the original file is also modified to include entries for these new sections. In block 706, the builder creates and places a new simplified import table under standard format for operating system use and points in that table to the execution control module.

The injected code gets control of the application immediately upon launch, and simply calls an imported function from the associated client or meter code DLL file. The client code within the meter code DLL then does all the necessary authentication, communication, decryption, and other such functions as described herein in implementation of the present invention. Depending on the type of executable being metered (EXE vs. DLL) the injected code consists of 12 to 19 bytes of hand-coded machine language instructions which simply uses the address of the imported client DLL function (from the new version of the imported table as established by the operating system loader), and transfers execution to it.

The builder thereby constructs the necessary machine code bytes and injects them into the product executable file at an appropriate location, i.e., as module 402. Next in block 710, the builder updates the "code entry point" or original start address field in the executable header to reference this injected code. In block 712 the builder encrypts additional portions of the original application. The operating system thereby gives control to the injected machine code, instead of the original application code, and control passes to, for example, section 402 and the associated meter code DLL file. Thus, upon execution of the controlled product the operating system establishes an operating environment according to only the simplified import table and upon passing control to the application the programming found in the execution control module provided under the present invention executes first. Important to note, the operating system has no access to the original import table, and the original application cannot possibly execute without authorization via the execution control module as provide under the present invention.

Under a particularly secure form of the present invention, execution authorization occurs by way of telecommunication interaction between the execution control module as a "client" and remote programming at a clearinghouse acting as a "server" as discussed above. Once authorization for execution of the original application occurs, the client or execution control module re-establishes the original imported functions table, removes or bypasses the injected machine code segment, and places the appropriate external function memory addresses as necessary in the imported functions table, i.e., as if the operating system had established this operating environment under normal load and execute procedures. Once the proper operating environment for execution of the original application has been established, then program control passes to the original start address indicated in the original application P.E. header start address field.

Figure 8:
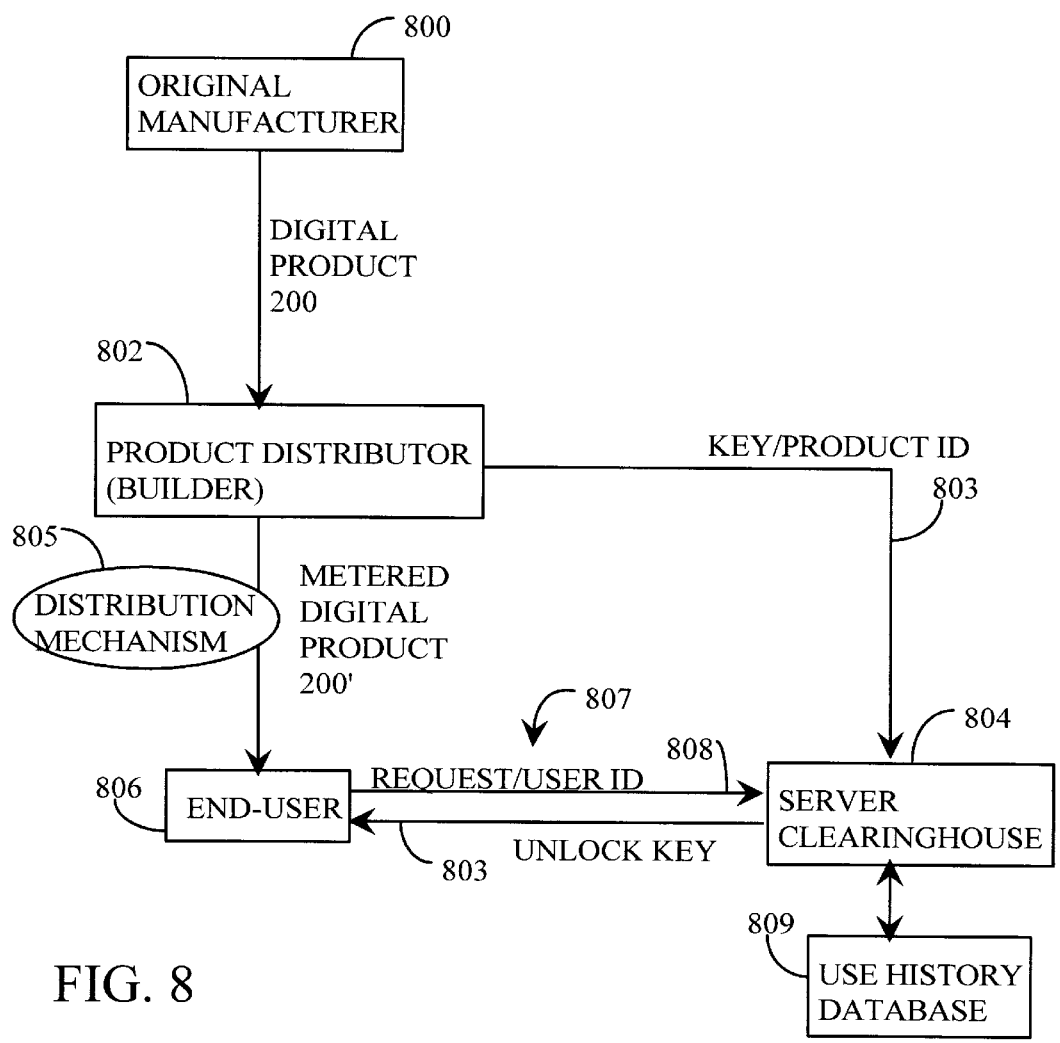
FIG. 8 illustrates manufacture, distribution, and execution of a metered digital product including selected encryption of portions of the digital product and execution control including a determination to allow execution at a remote site.

FIG. 8 illustrates generally digital product execution control via a remote clearinghouse interaction. In FIG. 8, an original manufacturer 800 produces a fully functional digital product 200 and passes digital product 200 to a product distributor 802. As discussed herein above, product distributor 802 executes the builder program of FIG. 7 to produce for distribution the metered digital product 200'. The builder program encrypts selected portions of the metered digital product 200 (block 712 of FIG. 7) as published for distribution and provides the unlock key and a product identifier 803 to a server/clearinghouse 804. Metered digital product 200' is then disseminated publicly through a variety of distribution mechanisms 805, e.g., diskettes, bulletin boards, CD ROM, and via networks including global communication networks such as the Internet. An end-user 806 receives a copy of metered digital product 200' and executes metered digital product 200' on a computing device. As discussed herein above, the client application incorporated into metered digital product 200' as execution control programming initiates a telephonic or network connection 807 with server/clearinghouse 804. The client application executing on the end-user 806 computing device provides a request/user ID 808 to the server/clearinghouse 804. The client application identifies a user to the server/clearinghouse 804 and the server/clearinghouse 804 tracks requests by this user to execute this digital product 200'. The server/clearinghouse 804 determines whether the user is authorized to execute the application and, if allowed, the server transmits the unlock key 803 to the end-user 806 computing device executing the client application. The client application makes use of unlock key 803 to decrypt previously encrypted portions, i.e., as encrypted by the builder program (FIG. 7), and facilitate execution of the actual digital product. If the user is not to be allowed use of this application, i.e., the server/clearinghouse 804 determines that an evaluation period has expired, the server does not transmit the unlock key 803 to the end-user 806 computing device but sends an "end of evaluation" message. The original application cannot then execute on the end-user 806 computing device. Without the unlock key 803 being stored permanently on the end-user 806 computing device, a malicious user would have to apply exceptional cryptanalytical attacks to defeat the encryption implemented in this embodiment of a metered digital product 200'. By using sufficiently long keys as key 803 attempts to break the encryption without use of key 803 become unfeasible.

To further increase security, that network communications between the end-user computing device executing the client application of metered digital product 200' and the server/clearinghouse 804 be encrypted with a combination of known or conventional public/private key encryption and symmetric key encryption algorithms to prevent electronic/digital eavesdropping on the client-server interaction.

Figure 9:
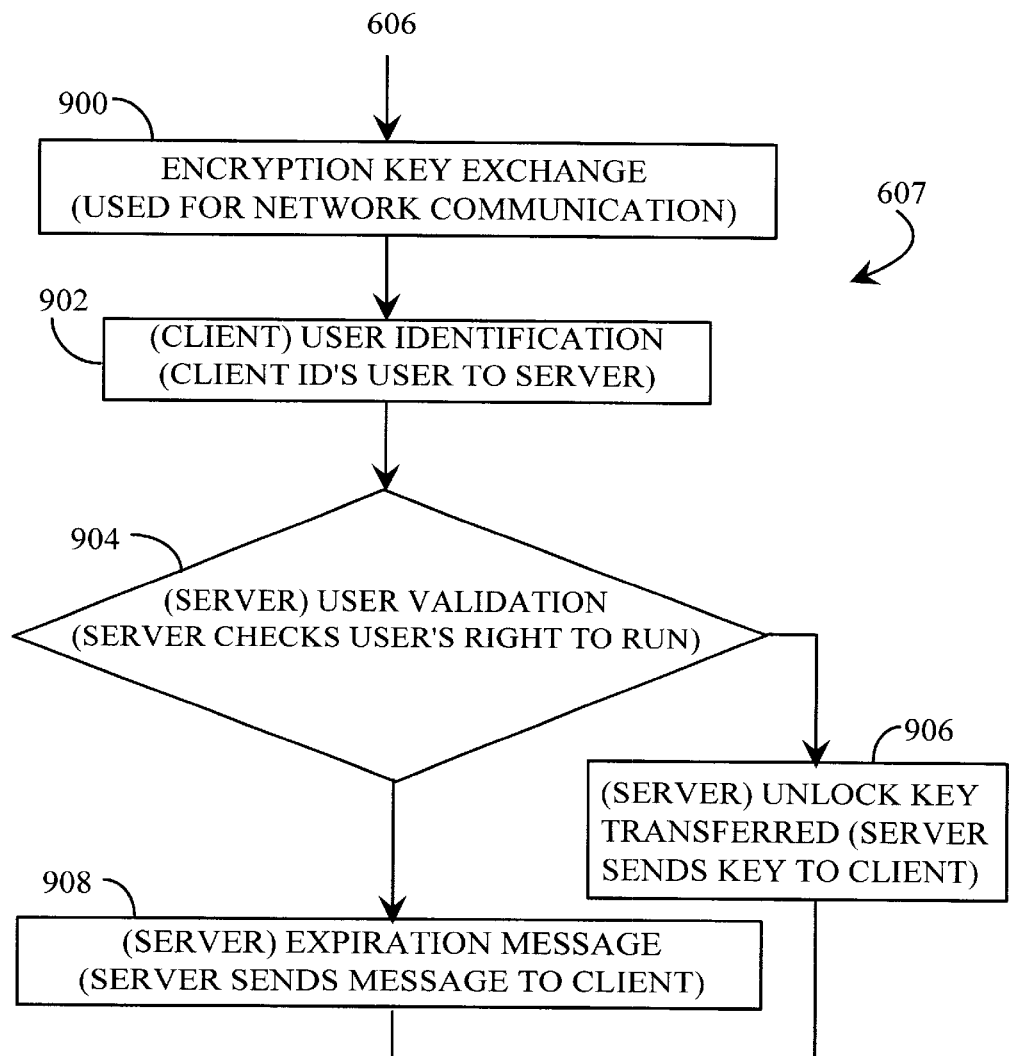
FIG. 9 illustrates by flow chart interaction between a client application and a remote server application imposing execution control in accordance with one embodiment of the present invention.

FIG. 9 illustrates programming corresponding to decision block 607 of FIG. 7 as applied in the context of execution control employing a client-server relationship as portrayed in FIG. 8. In FIG. 9, in block 900 the client application on the end-user 806 computing device and the server/clearinghouse 804 exchange encryption keys to establish according is to conventional practice a secure network communication. In block 902, the client application executing on the end-user 806 computing device sends the request/user ID 808 to server/clearinghouse 804. Decision block 904 executes at the server/clearinghouse 804. The server/clearinghouse 804 determines, based on the user ID and subject product, whether this particular user can execute this particular product at this time. As may be appreciated, the server/clearinghouse maintains a use history database 809 of users and products and applies an evaluation criteria, e.g., a number of executions or a time period of allowed execution, to respond appropriately to the request/user ID 808. If this particular user is allowed to execute this particular product at this time, then processing branches from decision block 904 to block 906 where the server/clearinghouse 804 delivers key 803 to the end-user 806 computing device. With key 803, the end-user computing device decrypts the previously encrypted portions of the original application and establishes the necessary operating environment to allow execution of the original application as described herein above. If, however, the user's evaluation use has expired, then processing branches from decision block 904 to block 908 where an expiration message may be delivered from clearinghouse 804 to the end-user 806 computing device indicating that execution is not allowed and that the evaluation use has expired.

Figure 10:
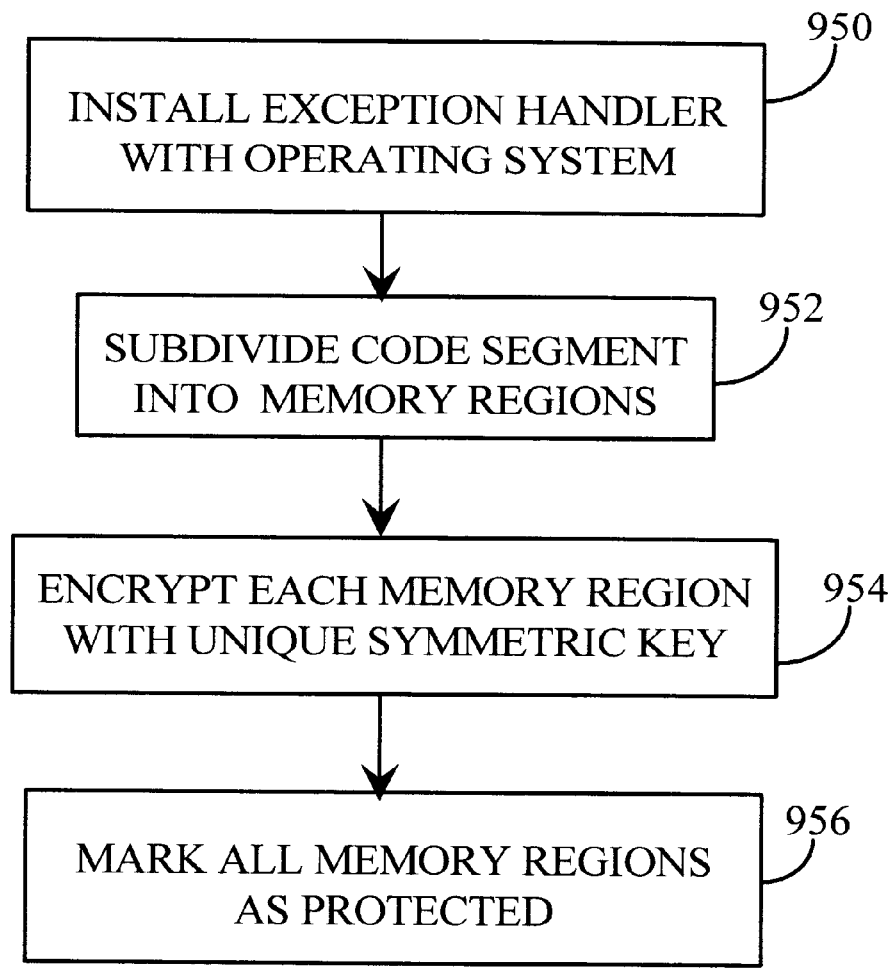
FIG. 10 illustrates by flow chart dynamic code segment encryption applied to an original code segment while allowed execution under the present invention.

Once execution is to be allowed, additional safeguards operate dynamically by way of selected encryption and decryption of the code section 302 during execution thereof. FIG. 10 illustrates processing applied to code segment 302 just prior to allowing execution of code segment 302. The programming of FIG. 10, in conjunction with that of FIG. 11, dynamically hides by encryption selected portions of code section 302 to prevent a malicious user from taking a "'snapshot" of an executatable form of code section 302 during execution of code section 302. Code section 302 is thereby made dependent on execution control programming. The programming of FIG. 10 may be inserted serially between decision block 607 and block 608 of FIG. 6.

Figure 11:
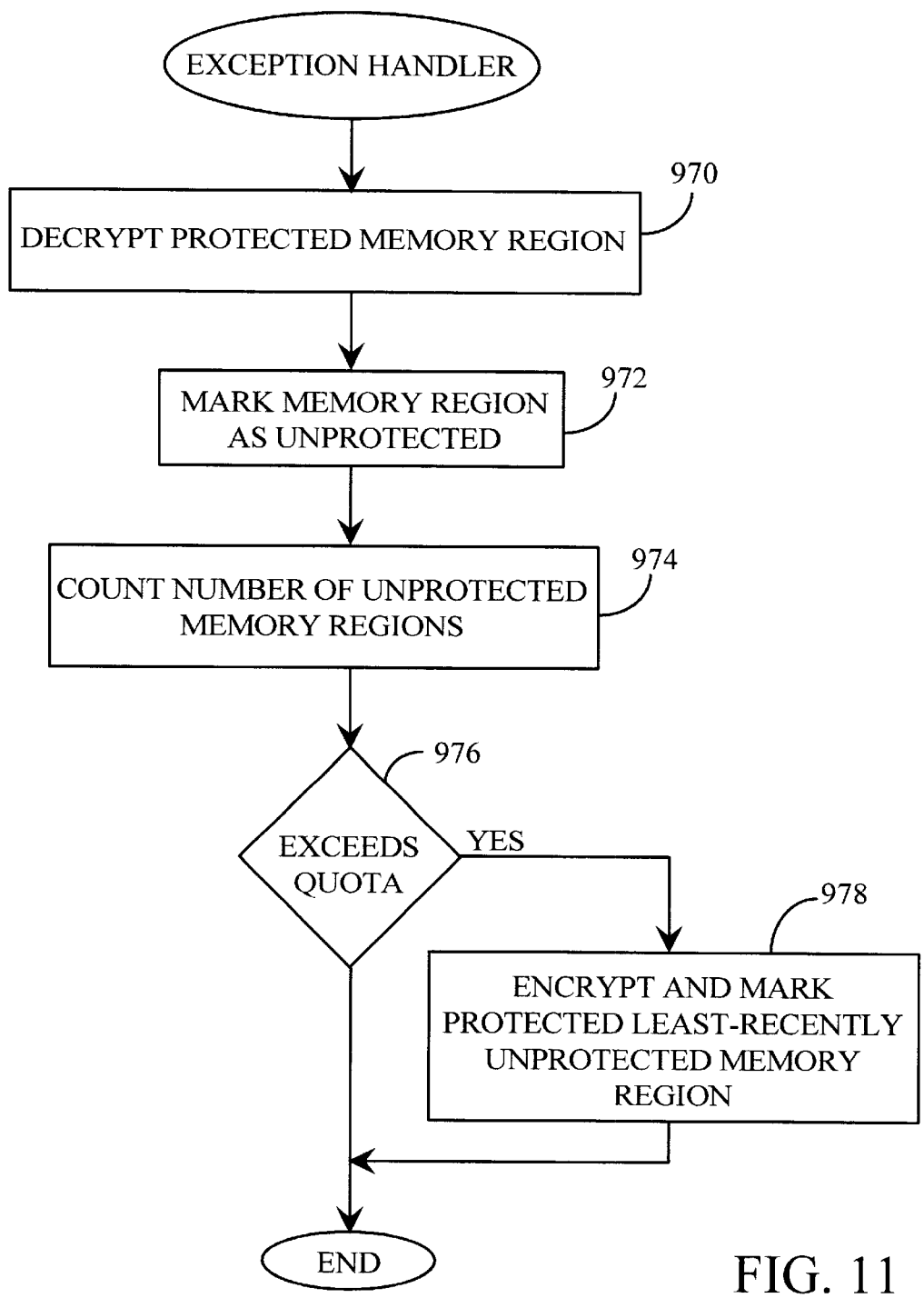
FIG. 11 illustrates by flow chart an exception handler operating in conjunction with the programming of FIG. 10 in managing dynamic encryption and decryption of a code segment during execution.

In FIG. 10, the programming executed in block 950 installs control programming as an "exception" handler with the operating system. Most common microprocessor architectures allow marking of selected memory regions as being "protected" or "unprotected." Processor access to protected memory regions invokes the exception handler. Under the present invention, the exception handler operates to dynamically maintain at all times a portion of code segment 302 in an encrypted form even during execution thereof. Thus, programming in block 950 represents installation of an exception handler as illustrated in FIG. 11. In block 952, control programming under the present invention subdivides code segment 302 into memory regions. Each memory region is encrypted in block 954 with a unique symmetric key, i.e., one unique key for each region. In block 956, all memory regions are marked as being protected. Upon access to any such region marked as being protected, the exception handler (FIG. 11) executes.

Once the original application is allowed to execute, i.e., execution control passed to code segment 302, and during the entire time of execution, the end-user computing device microprocessor executes instructions throughout the code segment 302. Each time the microprocessor attempts to access a memory region, i.e., one previously marked protected in block 956 of FIG. 10, the microprocessor, in conjunction with the operating system, transfers control to the exception handler as installed in block 950 of FIG. 10 and illustrated in FIG. 11.

In FIG. 11, the exception handler begins in block 970 where the memory region accessed is decrypted and thereby made suitable for execution. In block 972, the memory region is marked as being unprotected, thereby allowing continuous uninterrupted access to this memory region for purposes of execution. To prevent all memory regions from eventually being marked unprotected, processing in block 974 counts the number of remaining unprotected memory regions. Decision block 976 then determines whether this number of currently unprotected memory regions exceeds a given quota. In other words, decision block 976 determines whether additional encryption is needed to maintain a given portion of code segment 302 in an encrypted and non-executable form.

As may be appreciated, the particular proportion of encrypted versus executable portions of code section 302 will vary according to security and performance criteria. In any event, if additional memory regions of code segment 302 need to be re-encrypted and re-marked protected, then processing advances to block 978 where the least-recently unprotected memory region is again encrypted with a unique symmetric key and marked as being protected. In this manner, code segment 302 even while being executed, undergoes dynamic modification making a complete, static image of code segment 302 unavailable at any given time in the memory devices of the end-user computing device. At all times during execution, therefore, a minimum number or percentage of memory regions are encrypted and, therefore, non-executable. If a malicious user attempts to take a "snapshot" of the code segment 302 during execution, the user obtains an incomplete image of the original code segment 302. Furthermore, because memory regions are constantly undergoing encryption and decryption, a malicious user may be frustrated in identifying and predicting which regions are encrypted and which are decrypted at any given time.

As a further precaution against malicious attempts to recover portions of or monitor execution of code segment 302, the present invention contemplates a preemptive use of operating system debugging mechanisms. More particularly, the Win32 API (Application Programming Interface) standard (used by WINDOWS 95 (™) and WINDOWS NT (™)) provides a debugging mechanism allowing one program to "debug" another program. By invoking this debugging mechanism, a program gains access to a variety of useful information and control relative to the program being "debugged" including: the ability to view and modify memory space, the ability to view and modify thread context (the state of each execution thread in the process, including what part of the code a thread is executing at any given time), and notification of important events, such as when a thread is created or destroyed, when a new DLL module is loaded, when the process ends, when the process encounters certain error conditions.

Furthermore, the Win32 API standard enforces three important constraints on the relationship between one program invoking this debugging mechanism and the program being debugged. First, if the process invoking the debugging mechanism terminates, either on its own or through the control of any external process, the process being debugged is immediately terminated also. Second, if an application invoking the debugging mechanism is "attached" to a given program to be debugged that is already running, it (or any external process) cannot terminate the relationship without terminating the program being debugged. Third, if a program invoking the debugging mechanism is attached to a program being debugged, no other process can debug the same program being debugged.

This debugging mechanism available under Win32 API is used primarily by software developers to help find errors in programs under development. Commercial products are available on the market which use this debugging mechanism to aid in program development. Any such products or programs that use this Win32 API debugging function are commonly known as "local debuggers." These local debuggers operate as normal applications under the operating system.

Under the present invention, execution control programming launches a separate "debugger" process, which immediately attempts to debug the metered digital product 200'. More particularly, execution control programming under the present invention uses the Win32 API function DebugActiveProcess( ) to protect the executing metered digital product 200'. A second "local debugger" cannot thereby attach to the executing metered digital product 200'. This protective step prevents a malicious user from using a local debugger to look at the internal workings (and hence learn how to defeat) execution control. Once the debugger process has attached to the executing metered digital product 200', a malicious user cannot use a local debugger to view the operation of the metering or control programming because the operating system will not allow a second program to attach to or debug a program already being debugged. Similarly, if a malicious user has used a local debugger to debug the metered digital product 200' before execution, then when the metered digital product 200' attempts to call DebugActiveProcess( ) it will fail because the operating system will not allow a second program to attach to a program being debugged. Upon such failure, the control programming of the present invention simply exits. Furthermore, once the debugging process invoked by the metered digital product 200' has attached, a malicious user cannot terminate the debugger or "remove" the debugger to replace it with a second local debugger.

While this technique does not prevent a malicious user from using more sophisticated, i.e., "system-level" debuggers established with the operating system as "device drivers", it does prevent use of local debuggers which are common and more easily used than more sophisticated system-level debuggers.

Figure 12:
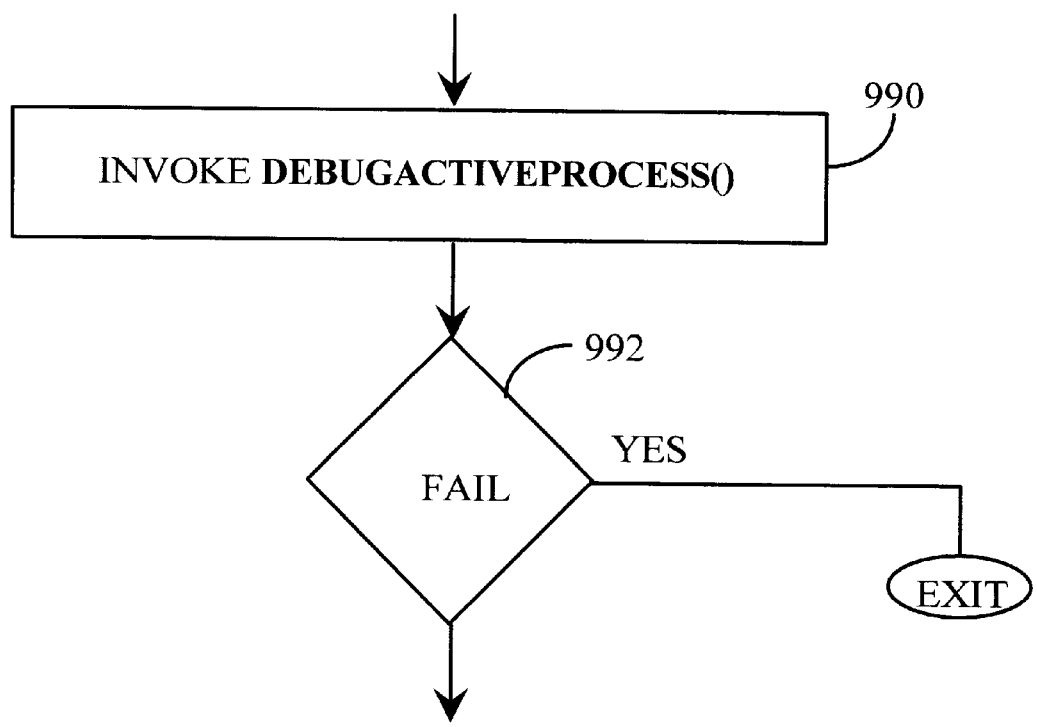
FIG. 12 illustrates by flow chart use of an operating system debugging mechanism to prevent malicious inspection of a digital product allowed execution under the present invention.

FIG. 12 illustrates programming executed at the onset of control programming to establish a preemptive use of the debugging mechanism. For example, the programming of FIG. 12 may be inserted as part of or just after block 606 of FIG. 6. In FIG. 12, block 990 represents invocation of the DebugActiveProcess( ) function available under the Win32 API standard. If the call to DebugActiveProcess( ) fails, then processing branches at decision block 992 and exits control programming entirely, i.e., terminates execution of control programming and thereby prevents execution of the digital product entirely. If, however, the call to DebugActiveProcess( ) succeeds, then processing continues as described above, but the control programming is made immune against inspection by means of a local debugger.

Thus, an improved method of digital product execution control has been shown and illustrated. Execution control under the present invention may be employed to prevent unauthorized use of a digital product, e.g., beyond an evaluation period, or to implement auxiliary functions, e.g., such as compression or decompression of a digital product for purposes of storage efficiency. The present invention allows a software developer to publish a full featured version of a software package without design or implementation concerns regarding execution control, e.g., without incorporating into the design process security features against unauthorized use. The present invention converts such a full-featured version of a software package to a demonstration version allowing an end-user to make full use of the application under a controlled execution thereof. Under one embodiment of the present invention, execution control includes authorization to execute at a remote clearinghouse site, thereby preventing local, i.e., user, manipulation of a digital product to avoid security measures implemented under the present invention. Potential customers thereby have an opportunity to evaluate fully a software package and determine whether it will meet their needs before they commit to a purchase. A purchase step may be incorporated into the execution control procedures described herein. Essentially, a purchase step would remove any execution control features, and allow full execution of the product without limitation.

It will be appreciated that the present invention is not restricted to the particular embodiment that has been described and illustrated, and that variations may be made therein without departing from the scope of the invention as found in the appended claims and equivalents thereof.

What is claimed is:

1. In an executable digital product having incorporated therein execution control programming limiting use of the digital product to a given controlled use, a method of providing security against use outside said given controlled use, said method comprising:

identifying an executable portion of said digital product to be loaded for execution in memory regions of a computing device;

identifying a plurality of sub-portions of said executable portion and encrypting into a non-executable form each sub-portion as loaded for execution in an associated memory region during said given controlled use, said sub-portions being thereby loaded for execution in an encrypted and non-executable state;

marking as protected memory regions holding each sub-portion; and establishing with an operating system an exception handler executed by said operating system during execution of said digital product and upon access to memory regions marked as protected, said exception handler thereby decrypting into an executable form each sub-portion when accessed and thereby controllably allowing use thereof.

2. A method according to claim 1 wherein said step of encrypting each sub-portion comprises encrypting each sub-portion with a unique encryption key.

3. A method according to claim 1 wherein said step of decrypting each sub-portion further comprises marking each associated memory region as being unprotected.

4. A method according to claim 1 wherein said method further comprises identification of memory regions marked as protected and selectively re-encrypting at least one sub-portion and re-marking as protected the associated memory region.

5. A method according to claim 1 wherein said operating system includes a debugging mechanism attachable to an executing process and said method further comprises an attempt to attach said debugging mechanism to said executable portion, said operating system allowing only one attachment of said debugging mechanism to a given executing process.

6. A method according to claim 5 wherein said control programming upon failure to attach said debugging mechanism terminates.

7. In an executable digital product having incorporated therein execution control programming limiting use of the digital product to a given controlled use, a method of providing security against use outside said given use, said method comprising:

encrypting at least one portion of said digital product prior to distribution, a key being necessary to decrypt and make executable said at least one portion, and storing said key in association with an identifier of said digital product at a clearinghouse, said clearinghouse being adapted for telecommunication interaction, said at least one portion in its encrypted form being thereby loaded for execution upon an attempt to load said executable digital product for execution; and incorporating into said control programming telecommunication programming adapted for interaction with said clearinghouse upon said attempt to load said executable digital product for execution, said control programming providing to said clearinghouse by telecommunication interaction upon execution thereof a product identifier and request to execute said digital product, said clearinghouse selectively providing said key to said control programming in response to said request to execute said digital product whereby said control programming thereafter decrypts and makes executable said at least one portion and passes execution control thereto.

8. A method according to claim 7 further comprising providing a user identification in conjunction with said request to execute.

9. A method according to claim 7 wherein said clearinghouse maintains a use history for a given user relative to said digital product and returns said key only when said given controlled use for said given user remains valid.

10. In an executable digital product having incorporated therein execution control programming limiting use of the digital product to a given controlled use, a method of providing security against use outside said given use, said method comprising:

encrypting at least one portion of said digital product prior to distribution of said digital product, a key being necessary to decrypt and make executable said at least one portion, and storing said key in association with an identifier of said digital product at a clearinghouse, said clearinghouse being adapted for telecommunication interaction, said at least one portion as encrypted being thereby non-executable and loaded for execution upon loading for execution said executable digital product;

incorporating into said control programming telecommunication programming adapted for interaction with said clearinghouse upon execution of said digital product, said control programming providing to said clearinghouse by telecommunication interaction upon execution thereof a product identifier and request to execute said digital product, said clearinghouse selectively providing said key to said control programming in response to said request to execute;

marking as protected memory regions holding said at least one portion as loaded for execution in its non-executable encrypted form; and establishing with said operating system an exception handler executed by said operating system during execution of said digital product and upon access to said memory regions marked as protected, said exception handler decrypting into executable form said at least one portion during execution of said digital product and when accessed for execution.

11. A method according to claim 10 further comprising providing a user identification in conjunction with said request to execute.

12. A method according to claim 10 wherein said clearinghouse maintains a use history for a given user relative to said digital product and returns said key only when said given controlled use for said given user remains valid.

13. A method according to claim 11 wherein said step of encrypting each sub-portion comprises encrypting each sub-portion with a unique encryption key.

14. A method according to claim 11 wherein said step of decrypting each sub-portion further comprises marking each associated memory region as being unprotected.

15. A method according to claim 11 wherein said method further comprises identification of memory regions marked as protected and selectively re-encrypting at least one sub-portion and re-marking as protected the associated memory region.

16. A method according to claim 11 wherein said operating system includes a debugging mechanism attachable to an executing process and said method further comprises an attempt to attach said debugging mechanism to said executable portion, said operating system allowing only one attachment of said debugging mechanism to a given executing process.

17. A method according to claim 16 wherein said control programming upon failure to attach said debugging mechanism terminates.

\* \* \* \* \*